United States Patent [19]

Maruyama et al.

[11] Patent Number: 4,741,025
[45] Date of Patent: Apr. 26, 1988

[54] SPEECH ADDITIVE DISTRIBUTION EQUIPMENT FOR CONFERENCING SYSTEM

[75] Inventors: Yuisuke Maruyama; Hitoshi Fuda, both of Tokyo; Hidetoshi Mori, Osaka; Hidetoshi Miura, Tokyo, all of Japan

[73] Assignees: NEC Corporation; Nippon Telegraph and Telephone Corporation, both of Japan

[21] Appl. No.: 835,685
[22] Filed: Mar. 3, 1986
[30] Foreign Application Priority Data Mar. 1, 1985 [JP] Japan .................. 60-40499

[51] Int. Cl.$^4$ ............................................ H04M 3/56
[52] U.S. Cl. ..................................... 379/202; 370/62
[58] Field of Search ............... 379/202, 201, 203, 204, 379/205, 206, 406, 409, 410; 370/62

[56] References Cited

U.S. PATENT DOCUMENTS

| 4,139,731 | 2/1979 | Hashemi et al. | 379/202 |
| 4,456,792 | 6/1984 | Courtney-Pratt | 379/202 |
| 4,475,190 | 10/1984 | Marouf et al. | 370/62 |
| 4,499,578 | 2/1985 | Marouf et al. | 370/62 |
| 4,535,445 | 8/1985 | Lane et al. | 370/62 |
| 4,635,252 | 1/1987 | Küchler | 370/32.1 |
| 4,648,108 | 3/1987 | Ellis et al. | 379/202 |

FOREIGN PATENT DOCUMENTS 57-133754 8/1982 Japan .

Primary Examiner—Jin F. Ng
Assistant Examiner—R. Vaas
Attorney, Agent, or Firm—Sughrue, Mion, Zinn, Macpeak and Seas

[57] ABSTRACT

An audio bridge for a telephone conference is disclosed. The audio bridge; comprises a channel signal processing unit assigned to at least three channels. Each channel signal processing circuit comprises an echo canceller to cancel an echo signal from the transmitting side fed back to the receiving side, an amplifier and attenuator circuits to adjust levels of an output of the echo canceller and a transmitting signal transmitted through the channel signal processing circuit, an ERL determining circuit to determine an echo cancellation on the basis of the output from the echo canceller and a signal level on the transmitting side, and a gain/loss computing circuit to compute a loss in a predominant voice condition and a gain and a loss in an inferior voice condition. The speech audio bridge further comprises audio bridge circuits which add the outputs of the amplifier circuits provided in the channel signal processing circuits except for the one assigned to itself, and a predominant channel detection unit for detecting a predominant channel and inferior channels on the basis of output levels of the amplifier circuits to suitably control the gain and loss of each channel according to the predominant and inferior voice conditions. Thus, this equipment makes it possible to prevent "singing" due to the variation of the cancellation with time.

13 Claims, 3 Drawing Sheets

SPEECH ADDITIVE DISTRIBUTION EQUIPMENT FOR CONFERENCING SYSTEM

BACKGROUND OF THE INVENTION

The present invention relates to an audio bridge using an echo canceller used in speech conferences etc.

In speech conferences, there has been used an audio bridge to add and synthesize speech signals transmitted from a plurality of conference attendants to transmit the synthesized speech signals to the respective conference attendants.

In such speech conferences, for the purpose of preventing a voice of the conference attendant himself from being fed back to a telephone receiver during conversation, a technique is employed to add only speech signals transmitted from other conference attendants except for the speech signal from the concerned conference attendant itself. Hitherto, a circuit arrangement using an echo canceller has been known as audio bridge.

For instance, a conference telephone system as shown in the Japanese Patent Laid-open No. 57-133754 comprises echo cancellers to cancel an echo signal fed back via a hybrid adapted for converting from 2-wire to 4-wire operation, audio bridge circuits, each being operative to add speech signals of channels except for the one assigned to itself to deliver the speech signals thus added to the receiver side of the conference attendant, and overload protecting circuits operative to control outputs of said audio bridge circuits so that overload condition does not occur in each receiving path of said echo cancellers and 4-wire transmission paths.

This conference telephone system can provide the following advantages: (1) There is no possibility that the transmission path is in overload condition. (2) Received sound volume is not lowered. (3) Echo loss is not Echo loss is not degraded, thus making it possible to prevent "singing". (4) Excellent speech quality can be obtained.

However, the drawback with such an audio bridge using the above-mentioned echo canceller is that echo cancellation or echo rejection level (referred to as ERL hereinafter) of the echo canceller varies with time, with the result that "singing" due to the variation of the cancellation with time cannot be avoided.

SUMMARY OF THE INVENTION

An object of the present invention is to provide an audio bridge for a conferencing system which makes it possible to prevent "singing" caused by changes in echo cancellation with time.

Another object of the present invention is to provide an audio bridge for a conferencing system which discriminates between a predominant or voiced channel and other inferior or unvoiced channels in terms of levels of received speech signals to suitably control the gain and loss of each channel according to the predominant and inferior voice conditions.

A further object of the present invention is to provide an audio bridge for a conferencing system wherein when the equipment is applied to a speech conferencing system having different channel losses, the equipment can promptly perform balance between respective channels.

According to the present invention, there is provided an audio bridge for a conferencing system, comprising: channel signal processing means comprising at least three channel signal processing circuits, each channel signal processing circuit including a receiving side for receiving a channel signal, a transmitting side for transmitting the channel signal, an echo canceller for cancelling an echo signal fed back to said receiving side from said transmitting side, means for adjusting levels of an output of the echo canceller and a transmitting signal transmitted through the transmitting side of the channel signal processing circuit, ERL determining means for determining an echo rejection level on the basis of the output from the echo canceller and a signal level on the transmitting side, gain/loss computing means responsive to the echo rejection level from the ERL determining means and a gain output of the echo canceller adjusted to be constant by the level adjusting means on the basis of the output of the echo canceller to compute a loss in a predominant voice condition and a gain and a loss in an inferior voice condition; an audio bridge unit having at least three adders in one to one correspondence with the channel signal processing circuits, each of the adders being adapted for adding the outputs of the echo cancellers level-adjusted by said level adjusting means provided in the channel signal processing circuits except for the one assigned to itself and supplying the resulting sum signal to the transmitting side of the channel signal processing circuit via the level adjusting means; a predominant channel detection unit for comparing respective output levels of the echo cancellers provided in the three channel signal processing circuits to judge that the channel condition of the channel signal processing circuit including the echo canceller having the maximum output level is predominant and to judge that the channel condition of the remaining channel signal processing circuits are inferior, thereby to control the level adjusting means provided in the channel signal processing circuit judged to be predominant on the basis of the gain and loss in the predominant voice condition from the gain/loss computing means of the channel signal processing means and to control the level adjusting means provided in the channel signal processing circuits judged to be inferior on the basis of the gain and loss in the inferior voice condition from the gain/loss computing means of the channel signal processing means.

The level adjusting means included in each of the at least three channel signal processing circuits comprises amplifier means to control the level of the output of the echo canceller included in the same channel signal processing circuit and attenuating means to attenuate the level of the transmitting signal transmitted through the transmitting side of the same channel signal processing circuit. The predominant channel detection unit is operative to give the gain and loss in the predominant voice condition to the amplifier means and the attenuating means provided in the channel signal processing circuit judged to be predominant, respectively, and to give the gain and loss in the inferior voice condition to the amplifier means and the attenuating means provided in the remaining channel signal processing circuits judged to be inferior, respectively.

The level adjusting means may further comprise a gain detection circuit to detect a control gain necessary for allowing the output level of the amplifier means to be kept constant on the basis of the output level of the echo canceller.

When the echo rejection level is represented by ERL, the gain and loss in the predominant voice condition are represented by $G_V$ and $L_V$, respectively, the gain and loss in the inferior voice condition are represented by $G_{NV}$ and $L_{NV}$, respectively, and a quasi-singing margin is represented by m, the gain/loss computing means is operative to compute the loss $L_{NV}$ in the predominant voice condition and the gain $G_{NV}$ and loss $L_{NV}$ in the inferior voice condition so that the following inequalities hold, $G_V - ERL - L_V + m < 0$, and
$G_{NV} - ERL - L_{NV} + m < 0$.

BRIEF DESCRIPTION OF THE DRAWINGS

The features and advantages of an audio bridge for a conferencing system according to the present invention will become more apparent from the following description taken in conjunction with the accompanying drawings in which.

DETAILED DESCRIPTION OF A PREFERRED EMBODIMENT

The present invention will be described in detail in connection with a preferred embodiment with reference to FIGS. 1 to 4.

Figure 1:
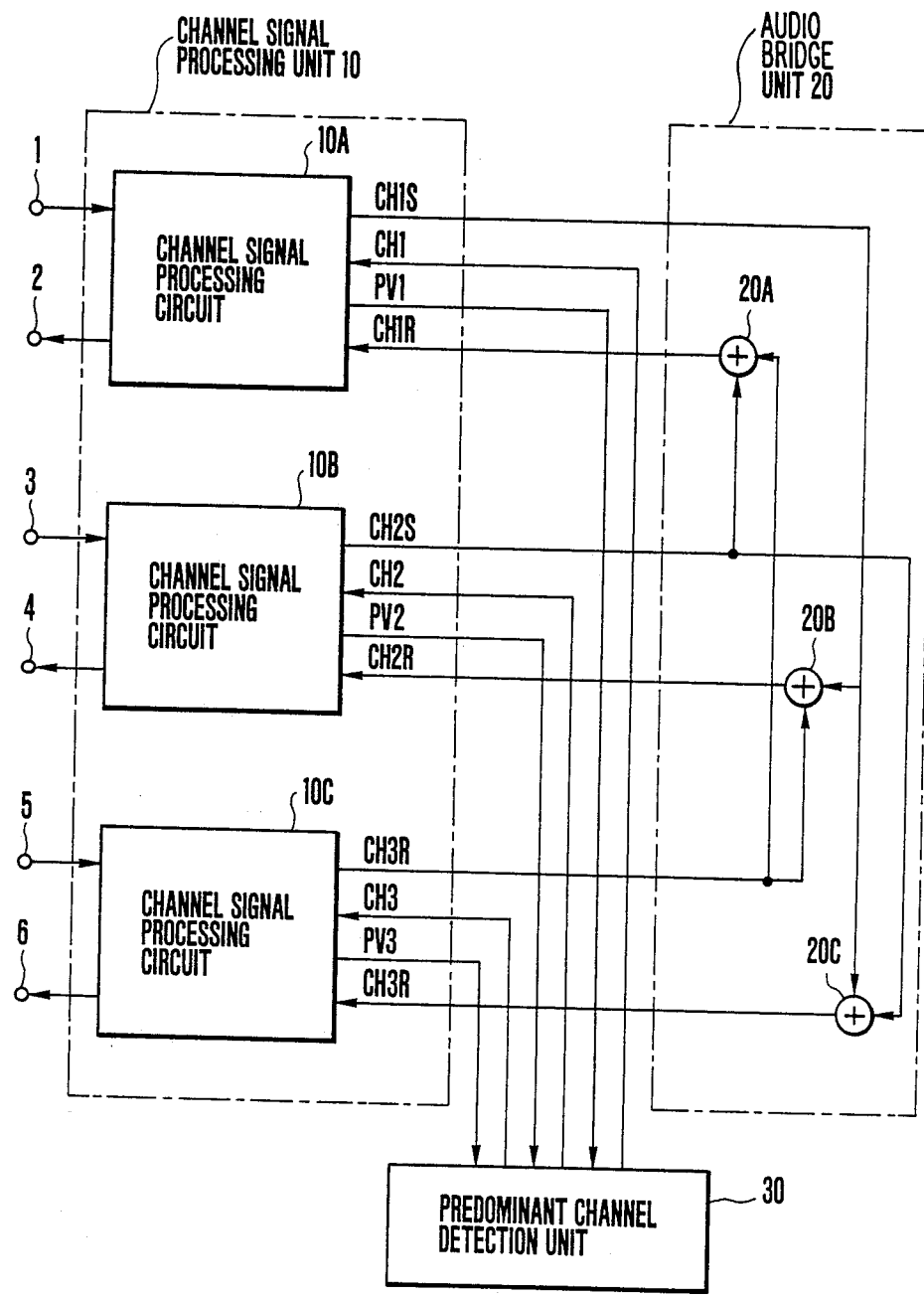
FIG. 1 is a block diagram illustrating an embodiment of an audio bridge for a conferencing system according to the present invention.

As shown in FIG. 1, an audio bridge of the preferred embodiment according to the present invention roughly comprises a channel signal processing unit the entirety of which is represented by reference numeral 10, an audio bridge 20 of which construction is similar to the conventional one, and a predominant channel detection unit 30. These units will be described later in more detail.

For brevity of the explanation in this embodiment, reference is made to the case where three conference attendants talk to each other by making use of the above-mentioned audio bridge.

Figure 2:
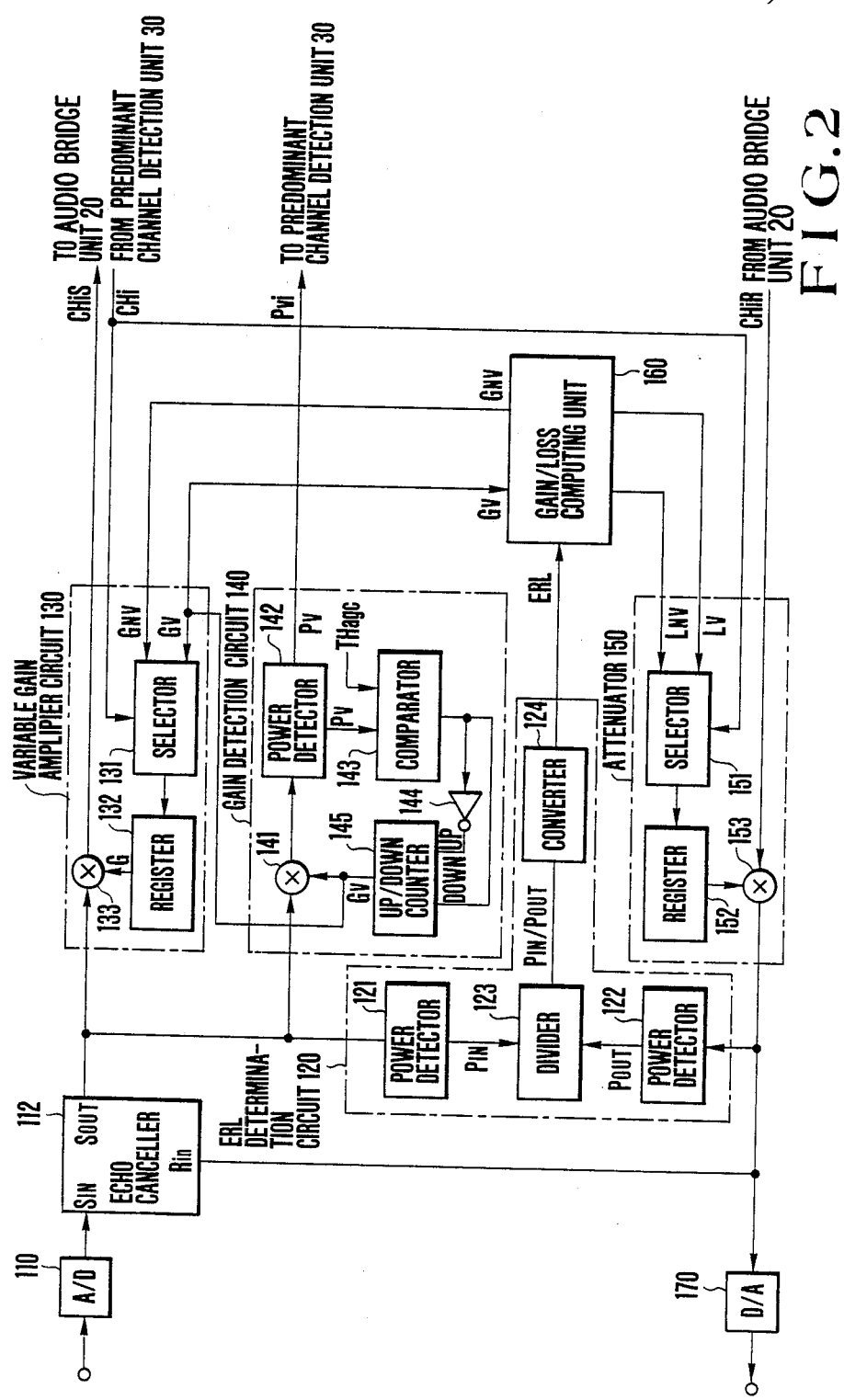
FIG. 2 is a block diagram illustrating a channel signal processing unit provided in the audio bridge shown in FIG. 1.

Accordingly, the channel signal processing unit 10 is provided with three channel signal processing circuits 10A, 10B, and 10C of the same construction. FIG. 2 shows the detail of the channel signal processing circuit 10A taken as an example. Since a digital echo canceller which 112 is employed in this embodiment, the channel signal processing circuit 10A is provided with an analog-to-digital (A/D) converter 110 on the signal receiving side and a digital-to-analog (D/A) converter 170 on the signal transmitting side. The echo canceller 112 is comprised of a digital VLSI having an input terminal $S_{IN}$ for a speech signal as a receiving signal incoming through the A/D converter 110, an input terminal $R_{IN}$ for a speech signal as a transmitting signal outgoing through the D/A converter 170, and an output terminal $S_{OUT}$. The echo canceller 112 responds to the incoming and outgoing speech signals to cancel an echo signal from the transmitting side fed back to the receiving side.

The channel signal processing circuit 10A further comprises an ERL determination circuit 120 for determining an ERL. The ERL determination circuit 120 is operative to compute an ERL (dB) including the echo canceller 112 on the basis of levels $P_R$ and $P_S$ of input and output signals to and from the echo canceller 112 by using the equation expressed as $ERL = P_S - P_R (dB)$. It is to be noted that the ERL can be measured solely when a signal having a sufficiently large level is input to the echo canceller 112 and an output signal from the output terminal $S_{OUT}$ includes only an echo component internally fed back thereto. Such a condition is called "single talk". However, it is difficult to actually discriminate the complete single talk. Accordingly, the ERL determination circuit 120 judges that the system is in the single talk when a condition, $P_S > P_R$, lasts for more than a predetermined time interval to hold this cancellation ERL at this time. As shown in FIG. 2, the ERL determination circuit 120 comprises a power detector 121 to detect the power level $P_{OUT}$ of the echo canceller 112, a power detector 122 to detect the power level $P_{IN}$ of the transmitting signal, a divider 123 to divide the power $P_{OUT}$ detected by the detector 121 by the power $P_{IN}$ detected by the detector 122, and a linear-to-dB converter to convert the output $P_{OUT}/P_{IN}$ of the divider 123 into an ERL by using the equation expressed as $ERL = 20 \log (P_{OUT}/P_{IN})$.

The channel signal processing circuit 10A has a further function to adjust an output level of the echo canceller 112 and a level of the transmitting signal. To realize this, the channel signal processing circuit 10A is provided with a variable gain amplifier circuit 130, a gain detection circuit 140 for effecting an automatic gain control (AGC) of the amplifier circuit 130, and an attenuator circuit 150. The amplifier circuit 130 comprises a selector 131 for selecting a gain $G_V$ in a predominant voice condition or a gain $G_{NV}$ in an inferior voice condition under control of the predominant channel detection unit 30, a register 132 for holding the output ($G_V$ or $G_{NV}$) selected by the selector 131, and an amplifier 133 configured as a multiplier for multiplying the output of the echo canceller 112 by the selected gain from the register 132. The gain detection circuit 140 functions to detect a control gain necessary for allowing the output level of the amplifier circuit 130 to be kept constant on the basis of the output level of the echo canceller 112. The gain detection circuit 140 has a characteristic of high speed response to detect an average level of an output of the echo canceller 112 over a relatively long time to output a level $P_V$ to the predominant channel detection unit 30. For instance, the gain detection circuit 140 comprises an amplifier 141 configured as a multiplier 141 for multiplying the output of the echo canceller 112 by the gain $G_V$ in the predominant voice condition, a power detector 142 for detecting the power level of the amplifier 141, a comparator 143 for comparing an output $P_V$ of the power detector with a target power level $TH_{agc}$, and an up/down or reversible counter 145 operative in response to the output of the comparator 143 directly or through an inverter 144 to produce the above-mentioned gain $G_V$ in the predominant voice condition. Further, the attenuator circuit 150 comprises a selector 151 for selecting a loss $L_V$ in the predominant voice condition or a loss $L_{NV}$ in the inferior voice condition under control of the predominant channel detection unit 30, a register 152 to hold the loss ($L_V$ or $L_{NV}$) selected by the selector 151, and an attenuator 153 configured as a multiplier for attenuating the level of the transmitting signal on the basis of the selected loss from the register 152.

Figure 3:
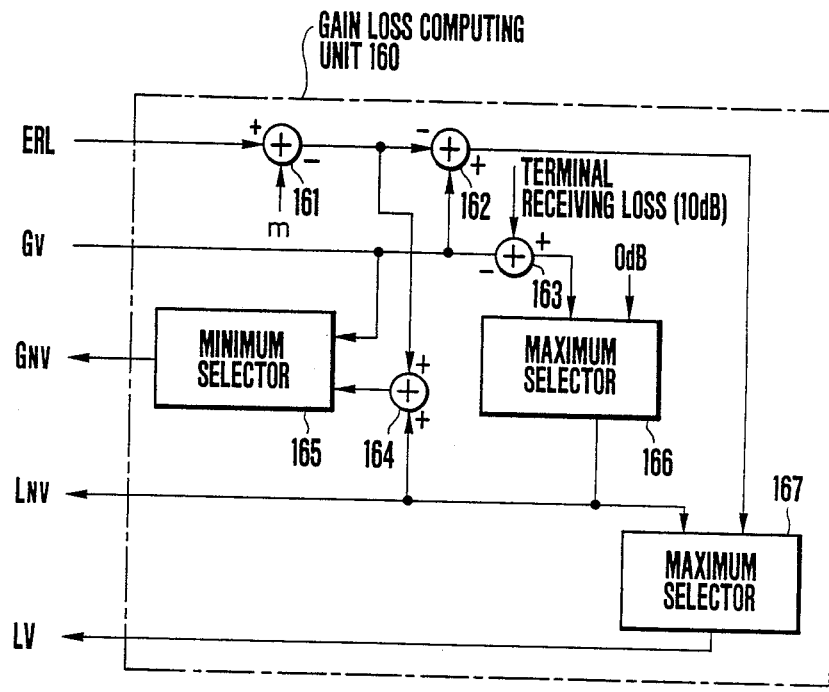
FIG. 3 is a circuit diagram illustrating a gain and loss computing unit provided in the channel signal processing unit shown in FIG. 2.
Figure 4:
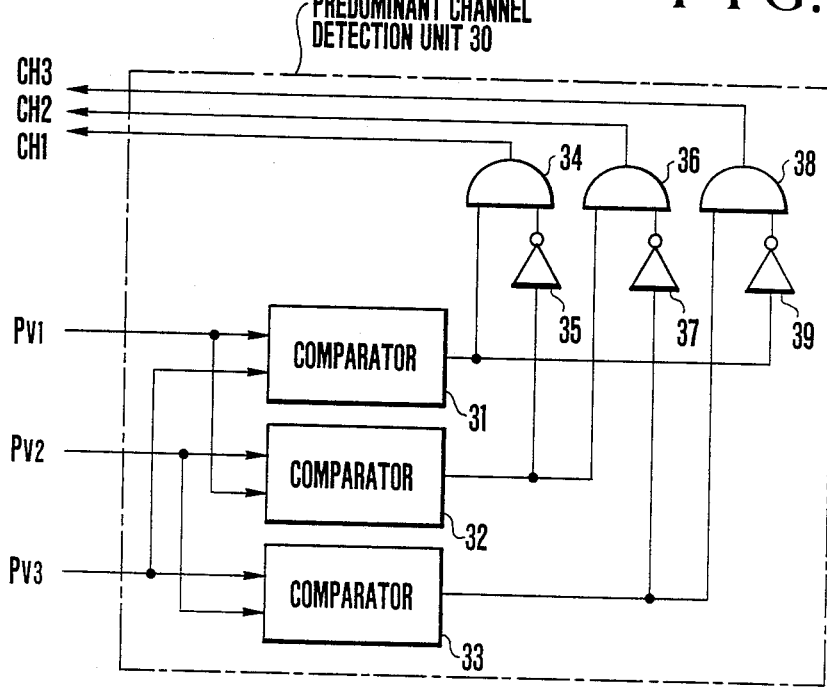
FIG. 4 is a circuit diagram illustrating a predominant channel detection unit provided in the audio bridge shown in FIG. 1.

The channel signal processing circuit 10A further comprises a gain/loss computing circuit 160 which responds to the ERL from the ERL determination circuit 120 and the gain $G_V$ in the predominant voice condition for computing the loss $L_V$ in the predominant voice condition and the gain $G_{NV}$ and the loss $L_{NV}$ in the inferior voice condition. As shown in FIG. 3, the gain/loss computing circuit 160 comprises subtractors 161, 162 and 163, an adder 164, and selectors 165, 166 and 167. The gain/loss computing circuit 160 is operative to compute the gain $G_V$ or $G_{NV}$ of the amplifier circuit 130 and the loss or attenuation $L_V$ or $L_{NV}$ of the attenuation circuit 150 on the basis of the following equations:

$$L_{NVi} = \max(0 \text{ dB}, L_{TR} - G_{Vi}) \quad (1)$$

$$G_{NVi} = \min(G_{Vi}, ERL_i + L_{NVi} - m), \quad (2)$$

and $$L_{Vi} = \max(G_{Vi} - ERL + m, L_{NV}) \quad (3)$$

where m is a quasi-singing margin and $L_{TR}$ is a terminal receiving loss e.g. 10 dB.

The above-mentioned audio bridge unit 20 comprises three adders 20A, 20B and 20C provided in one to one correspondence to the three channel signal processing circuits 10A, 10B and 10C. Each adder adds the power outputs CHiS from the variable gain amplifier circuits 130 provided in the signal processing circuits 10A, 10B and 10C except for the one corresponding to itself, and supplying the resulting sum signal as the transmitting signal CHiR to the attenuator 150. Further, the above-mentioned predominant channel detection unit 30 compares respective output levels ($P_V$) of the gain detection circuits 140 provided in the three channel signal processing circuits to judge that the channel condition of the channel signal processing circuit including the gain detection circuit 140 having the maximum output level is predominant and to judge that the channel condition of the remaining channel signal processing circuits are inferior, thereby to control the amplifier circuit 130 and the attenuator circit 150 provided in the channel signal processing circuit judged to be predominant on the basis of the gain and loss in the predominant voice condition and to control the amplifier circuit 130 and the attenuator circuit 150 provided in the channel signal processing circuits judged to be inferior on the basis of the gain and loss in the inferior voice condition.

The operation of the audio bridge unit 20 thus configured will now be described.

It is assumed that the predominant channel detection unit 30 judges that the channel condition of the channel signal processing circuit 10A is predominant and the channel condition of the channel signal processing circuits 10B and 10C are inferior. The selector 131 provided in the circuit 10A responds to a control signal $CH_1$ indicating the predominant condition to select the gain $G_{V1}$ in the predominant voice condition obtained from the gain detection circuit 140 to feed it to the amplifier 133 on the basis of the equation (1). Further, the selector 151 provided in the circuit 10A also responds to this control signal $CH_1$ to select the loss $L_{V1}$ in the predominant voice condition computed by the computing circuit 160 on the basis of the equation (3) to feed it to the attenuator 153 for prevention of singing.

On the other hand, selectors (corresponding to the selector 131) provided in the channel signal processing circuits 10B and 10C respond to control signals $CH_2$ and $CH_3$ indicating the inferior condition to select the gains $G_{NV2}$ and $G_{NV3}$ which are set to the maximum value within a range where the system is not placed in the quasi-singing to feed them to amplifiers (corresponding to the amplifier 133). Further, selectors (corresponding to the selector 151) provided in the channel signal processing circuits 10B and 10C respond to control signals $CH_2$ and $CH_3$ indicating the inferior condition to select losses $L_{NV2}$ and $L_{NV3}$ in the inferior voice condition computed by the computing circuit 160 on the basis of the equation (1) to feed them to attenuators (corresponding to the attenuator 153), thus providing a necessary echo cancellation to prevent the system from singing.

When the audio bridge according to the present invention is applied to a speech conferencing system having different channel losses, it can reduce the difference between receiving levels of different channels.

Namely, since the respective amplifier circuits have AGC functions, it is possible to evaluate respective channel losses on the basis of the gains given by the AGC. Accordingly, an average receiving level can be evaluated on the basis of the above-mentioned channel losses. This makes it possible to allow the receiving levels to be equal to each other by inserting suitable losses in the transmission channels up to the terminal equipment. Thus, the audio bridge according to the present invention makes it possible to minimize the difference between receiving levels, thus providing greatly improved speech quality.

In the above-mentioned embodiment, it has been described that a digital echo canceller is used. Without being limited to this implementation, the present invention can be similarly applied to the equipment using an analog echo canceller.

What is claimed is:

1. An audio bridge for a conferencing system, comprising:
    channel signal processing means comprising at least three channel signal processing circuits, each of said channel signal processing circuits including, respectively, a receiving side for receiving a channel signal, a transmitting side for transmitting a channel signal, an echo canceller for cancelling an echo signal fed back to said receiving side from said transmitting side, means for adjusting levels of an output of said echo canceller and a transmitting signal transmitted through the transmitting side of said channel signal processing circuit, ERL determining means for determining an echo rejection level on the basis of said output from said echo canceller and a signal level on said transmitting side, and gain/loss computing means responsive to said echo rejection level from said ERL determining means and a gain for the output of the echo canceller for computing a gain and a loss in a predominant voice condition and a gain and a loss in an inferior voice condition;
    audio bridge circuit means having a respective adder means for each said channel signal processing circuit, each of said adder means adding the outputs of the echo cancellers, level-adjusted by said level adjusting means, except for the respective echo canceller, and supplying a resulting sum signal to said transmitting side of the respective channel signal processing circuit via the respective level adjusting means; and
    a predominant channel detection means for comparing respective output levels of said echo cancellers for judging whether the channel condition of the channel signal processing circuit including the echo canceller having a maximum output level is predominant and for judging whether the channel conditions of the remaining channel signal processing circuits are inferior, thereby to control the level adjusting means provided in the channel signal processing circuit judged to be predominant on the basis of said gain and loss in said predominant voice condition from said gain/loss computing means of the predominant channel signal processing means and to control the respective level adjusting means provided in the channel signal processing circuits judged to be inferior on the basis of said gain and loss in the respective inferior voice condition from the respective gain/loss computing means of the remaining channel signal processing means.

2. An audio bridge as set forth in claim 1, wherein each of said level adjusting means comprises, respectively, means for controlling the level of the output of the respective echo canceller and attenuating means for attenuating the level of the respective transmitting signal.

3. An audio bridge as set forth in claim 2, wherein said predominant channel detection means is operative to give said gain and loss in said predominant voice condition to the amplifier means and the attenuating means provided in said channel signal processing circuit judged to be predominant, respectively, and to give said gain and loss in said inferior voice condition to the amplifier means and the attenuating means provided in said channel signal processing circuits judged to be inferior, respectively.

4. An audio bridge as set forth in claim 2, wherein each of said level adjusting means further comprises, respectively, a gain detection circuit to detect a control gain necessary for allowing the output level of the amplifier means to be kept constant on the basis of the output level of the respective echo canceller.

5. An audio bridge as set forth in claim 1, wherein each of said ERL determining means comprises, respectively, a first power detector for detecting the output level of the respective echo canceller, a second power detector for detecting the level of the respective transmitting signal, a divider for dividing an output of said first power detector by an output of said second power detector, and a converter to conver an output of said divider into the echo rejection level.

6. An audio bridge as set forth in claim 2, wherein each of said amplifier means comprises, respectively, a selector to select the gain in the predominant voice condition or the gain in the inferior voice condition under control of said predominant channel detection means, a register to hold an output selected by said selector, and a multiplier to multiply the output of the respective echo canceller by the selected output held by the register.

7. An audio bridge as set forth in claim 2, wherein each of said attenuating means comprises, respectively, a selector to select the loss in the predominant voice condition or the loss in the inferior voice condition from the respective gain/loss computing means under control of said predominant channel detection means, a register to hold an output selected by said selector, and an attenuator to attenuate the level of the respective transmitting signal on the basis of the output held by said register.

8. An audio bridge as set forth in claim 4, wherein each said gain detection circuit comprises, respectively, a multiplier to multiply the output of the respective echo canceller by the gain in the predominant voice condition, a level detector to detect the output of said multiplier, a comparator to compare the output of said level detector with a target level, and a reversible counter responsive to the compared result of said comparator to produce said gain in the predominant voice condition.

9. An audio bridge as set forth in claim 1, wherein said echo rejection level is represented by ERL, gain and loss in said predominant voice condition are represented by $G_V$ and $L_V$, respectively, gain and loss in said inferior voice condition are represented by $G_{NV}$ and $L_{NV}$, respectively, and a quasi-singing margin is represented by m, and wherein each of said gain/loss computing means computes, respectively, the gain $G_V$ and loss $L_V$ in said predominant voice condition and the gain $G_{NV}$ and loss $L_{NV}$ in said inferior voice condition so that the following inequalities hold, $G_V - ERL - L_V + m < 0$, and
$G_{NV} - ERL - L_{NV} - m < 0$.

10. An audio bridge as set forth in claim 9, wherein said each of said gain/loss computing means comprises, respectively, a first subtractor for subtracting said quasi-singing margin m from said echo rejection level ERL, an adder for adding an output ERL$-$m to the said loss $L_{NV}$ in the inferior voice condition, a first selector for selecting the gain $G_V$ in said predominant voice condition or an output ERL$-$m$+L_{NV}$ of said adder to obtain the gain $G_{NV}$ is said inferior voice condition by using the equation expressed as min ($G_V$, ERL$+L_{NV}-$m).

11. An audio bridge as set forth in claim 10, wherein each of said gain/loss computing means further comprises, respectively, a second subtractor for subtracting the gain $G_V$ in the predominant voice condition from a predetermined terminal processing loss represented by $L_{TR}$, and a second selector for selecting an output $L_{TR}-G_V$ of said second subtractor or a loss of zero dB to obtain the loss $L_{NV}$ in the inferior voice condition by using the equation expressed as max (0 dB, $L_{TR}-G_V$).

12. An audio bridge as set forth in claim 11, wherein each of said .gain/loss computing means further comprises, respectively, a third subtractor for subtracting said output ERL$-$m from the gain $G_V$ in the predominant voice condition, and a third selector for selecting an output ($G_V-$ERL$-$m) of said third subtractor or the loss $L_{NV}$ in the inferior voice condition to obtain the loss $L_{NV}$ in the predominant voice condition by using the equation expressed as max ($G_V-$ERL$+$m, $L_{NV}$).

13. An audio bridge as set forth in claim 4, wherein said predominant channel detection means comprises comparator circuitry for comparing respective outputs of the gain detection means in said at least three channel signal processing circuits, and gate circuitry responsive to a comparison output from said comparator circuitry for producing a control signal having a first logic state for the channel signal processing circuit judged to be predominant and for producing signals having a second, opposite, logic state for the channel signal processing circuits judged to be inferior.

* * * * *